(12) United States Patent
Yamada et al.

(10) Patent No.: US 10,145,038 B2
(45) Date of Patent: Dec. 4, 2018

(54) WOVEN FABRIC, METHOD FOR MANUFACTURING DESIGN WOVEN FABRIC AND METHOD FOR MANUFACTURING INTERIOR MATERIAL

(71) Applicants: TOYOTA BOSHOKU KABUSHIKI KAISHA, Aichi-ken (JP); DAIKI CO., LTD., Fukui-ken (JP)

(72) Inventors: Takamasa Yamada, Aichi-ken (JP); Shingo Okahara, Aichi-ken (JP); Mitsutaka Sakoh, Aichi-ken (JP); Hideo Kanamori, Aichi-ken (JP); Atsuhiko Ito, Aichi-ken (JP); Takayoshi Yamamoto, Fukui-ken (JP)

(73) Assignees: TOYOTA BOSHOKU KABUSHIKI KAISHA, Aichi-Ken (JP); DAIKI CO., LTD., Fukui-Ken (JP)

( * ) Notice: Subject to any disclaimer, the term of this patent is extended or adjusted under 35 U.S.C. 154(b) by 32 days.

(21) Appl. No.: 15/595,121

(22) Filed: May 15, 2017

(65) Prior Publication Data
US 2017/0342607 A1    Nov. 30, 2017

(30) Foreign Application Priority Data
May 26, 2016    (JP) .................................. 2016-105666

(51) Int. Cl.
*D03D 15/00*    (2006.01)
*F21V 8/00*    (2006.01)
(Continued)

(52) U.S. Cl.
CPC ............... *D03D 15/00* (2013.01); *D03D 3/06* (2013.01); *D03D 11/02* (2013.01);
(Continued)

(58) Field of Classification Search
CPC ........ G02B 6/001; G02B 6/04; G02B 6/0006; G02B 6/443; G02B 6/0005; G02B 6/0008;
(Continued)

(56) References Cited

U.S. PATENT DOCUMENTS 4,234,907 A * 11/1980 Daniel ................. A41D 27/085
139/420 R
5,021,928 A * 6/1991 Daniel ................ B29C 47/0019
362/293
(Continued)

FOREIGN PATENT DOCUMENTS

JP    2010-267573    11/2010

*Primary Examiner* — Bobby Muromoto, Jr.
(74) *Attorney, Agent, or Firm* — Greenblum & Bernstein, P.L.C.

(57) ABSTRACT

A woven fabric which enables protection of optical fiber yarns while the woven fabric is processed into a design woven fabric and easy exposure of the optical fiber yarns when the protection thereof becomes unnecessary, a method for manufacturing a design woven fabric from this woven fabric, and a method for manufacturing an interior material including: A woven fabric having a first constituent yarn having an optical fiber yarn and a non-light guiding yarn and a second constituent yarn having a non-light guiding yarn. The woven fabric having a first region in which the first and second constituent yarns are woven in one layer and a second region which is positioned adjacent to the first region and in which the first and second constituent yarns and are woven in two or more separable layers. The woven fabric has an optical fiber layer and a back protecting layer as the separable layers. The optical fiber layer is a layer formed of the optical fiber yarns. The back protecting layer is a layer in which the non-light guiding yarn of the first constituent yarn and the non-light guiding yarn of the second constituent
(Continued)

yarn are woven. Further, the woven fabric can further have a front protecting layer.

14 Claims, 4 Drawing Sheets

(51) Int. Cl.
    *F21V 9/00*         (2018.01)
    *D03D 3/06*         (2006.01)
    *D03D 11/02*       (2006.01)
    *D03D 11/00*       (2006.01)
    *D03D 13/00*       (2006.01)

(52) U.S. Cl.
    CPC ...... *D10B 2401/20* (2013.01); *F21V 2200/15* (2015.01); *G02B 6/001* (2013.01); *G02B 6/0005* (2013.01)

(58) Field of Classification Search
    CPC .. G02B 6/0031; G02B 6/0055; G02B 6/4486; G02B 5/3041; D03D 15/00; D03D 1/0088; D03D 11/00; D03D 1/00; D03D 13/004; F21V 2200/15; F21V 33/0008; A41D 27/085; A41D 13/01; H05B 33/12
    See application file for complete search history.

(56) References Cited

U.S. PATENT DOCUMENTS

| | | | | |
|---|---|---|---|---|
| 6,490,402 | B1* | 12/2002 | Ota | D02G 3/441 257/E25.02 |
| 6,628,885 | B1* | 9/2003 | Wilkie | D02G 3/441 362/554 |
| 6,851,844 | B2* | 2/2005 | Guy | D03D 15/00 362/556 |
| 7,237,933 | B2* | 7/2007 | Radu | B29C 45/14778 296/146.7 |
| 9,335,457 | B2* | 5/2016 | Zimmermann | D03D 1/00 |
| 2002/0044740 | A1* | 4/2002 | Lee | F21S 2/00 385/31 |
| 2002/0168156 | A1* | 11/2002 | Quiroz | G02B 6/4416 385/114 |
| 2003/0006693 | A1* | 1/2003 | Topelberg | H05B 33/12 313/483 |
| 2003/0090200 | A1* | 5/2003 | Topelberg | H05B 33/26 313/511 |
| 2003/0113081 | A1* | 6/2003 | Melby | A41D 27/085 385/120 |
| 2003/0174989 | A1* | 9/2003 | Lanier | G02B 6/443 385/128 |
| 2003/0185529 | A1* | 10/2003 | Register, III | G02B 6/443 385/114 |
| 2005/0223464 | A1* | 10/2005 | Huang | A41D 13/01 2/102 |
| 2005/0252568 | A1* | 11/2005 | Huang | D03D 1/0088 139/420 A |
| 2006/0087832 | A1* | 4/2006 | Peng | D03D 15/00 362/103 |
| 2006/0139948 | A1* | 6/2006 | Huck | G02B 5/3008 362/607 |
| 2006/0194487 | A1* | 8/2006 | Ouderkirk | B82Y 20/00 442/59 |
| 2006/0257095 | A1* | 11/2006 | Walt | A61B 5/6804 385/147 |
| 2007/0153162 | A1* | 7/2007 | Wright | G02B 5/3025 349/96 |
| 2007/0154132 | A1* | 7/2007 | Mates | D03D 1/0082 385/14 |
| 2007/0229950 | A1* | 10/2007 | Ouderkirk | B29D 11/00278 359/454 |
| 2007/0230883 | A1* | 10/2007 | Hart | G02B 5/3008 385/123 |
| 2007/0237938 | A1* | 10/2007 | Ouderkirk | B29D 11/00278 428/292.1 |
| 2007/0239232 | A1* | 10/2007 | Kurtz | A61N 5/0613 607/87 |
| 2008/0002393 | A1* | 1/2008 | Moon | G02B 6/0006 362/97.1 |
| 2008/0055724 | A1* | 3/2008 | Bluem | G02B 5/3008 359/487.06 |
| 2009/0291606 | A1* | 11/2009 | Malhomme | D03D 11/00 442/301 |
| 2010/0114263 | A1* | 5/2010 | Pressler | A61N 5/0621 607/88 |
| 2010/0293698 | A1* | 11/2010 | Burr | A41D 31/0072 2/243.1 |
| 2011/0176326 | A1* | 7/2011 | Stephan | G02B 6/0008 362/555 |
| 2015/0177436 | A1* | 6/2015 | Zimmermann | D03D 1/00 362/510 |
| 2017/0342607 | A1* | 11/2017 | Yamada | D03D 15/00 |
| 2017/0342608 | A1* | 11/2017 | Yamada | D03D 15/0094 |
| 2017/0343736 | A1* | 11/2017 | Yamada | G02B 6/001 |
| 2018/0023776 | A1* | 1/2018 | Greene | F21S 41/29 362/511 |
| 2018/0023801 | A1* | 1/2018 | Athauda | A41D 27/085 362/103 |

\* cited by examiner

WOVEN FABRIC, METHOD FOR MANUFACTURING DESIGN WOVEN FABRIC AND METHOD FOR MANUFACTURING INTERIOR MATERIAL

CROSS-REFERENCE TO RELATED APPLICATIONS

The present application claims priority under 35 U.S.C. § 119 of Japanese Application No. 2016-105666 filed on May 26, 2016, the disclosure of which is expressly incorporated by reference herein in its entirety.

BACKGROUND

1. Technical Field

The present invention relates to a woven fabric, a method for manufacturing a design woven fabric, and a method for manufacturing an interior material. More specifically, the invention relates to a woven fabric comprising an optical fiber as a constituent yarn, a method for processing this woven fabric into a design woven fabric, and a method for manufacturing an interior material comprising this design woven fabric as a design layer.

2. Related Art

Conventionally, woven fabrics comprising an optical fiber that is capable of side emission, as a constituent yarn, have been proposed. Once light is made incident on this woven fabric from one end, the incident light is leaked from an optical fiber side surface to the external for a period until the incident light arrives at the other end. Thus, the woven fabric is configured so that its surface appears to emit light. As such a woven fabric comprising an optical fiber that is capable of side emission, the technique disclosed in JP 2010-267573 A (Patent Literature 1) is known.

SUMMARY

The optical fiber woven fabric disclosed in Patent Literature 1 comprises a plurality of optical fibers in the woven fabric, and it is necessary to introduce light into the individual optical fibers in order to make the optical fibers emit light. Since the use of individual light sources for the respective optical fibers at this time is not efficient, it is a general way to collect the end parts of the plurality of optical fibers to form a collected end part and to make one light source correspond to this collected end part, thereby introducing light to the plurality of optical fibers at the same time.

In this regard, Patent Literature 1 indicated above discloses "drawing a plurality of optical fibers from one end part of an optical fiber woven fabric, bundling the tip end parts of these optical fibers into a ring shape and fixing the optical fibers to a light guiding cylindrical body made of aluminum" (paragraph [0039]), but does not refer to the method for drawing the optical fibers from the woven fabric.

Conventionally, there have been adopted methods for drawing optical fibers from a woven fabric by pulling out warps when the optical fibers are utilized as wefts or pulling out wefts when the optical fibers are utilized as warps to eliminate these yarns. FIGS. 1 to 3 of Patent Literature 1 indicated above show a state where the exposed ends of the optical fibers are collected, and it is necessary to pull out yarns interlaced with the optical fibers to expose the optical fibers to an end part of the woven fabric as conventional, although Patent Literature 1 does not describe the method for drawing the optical fibers from the woven fabric as described above.

However, labor and time are required to pull out the other constituent yarns interlaced with the optical fibers in the woven fabric, and there is a risk of damaging the optical fibers when pulling out the other constituent yarns.

The present invention has been made in light of the actual situation, and an object of the present invention is to provide a woven fabric which enables protection of optical fiber yarns while the woven fabric is processed into a design woven fabric and easy exposure of the optical fiber yarns when the protection thereof becomes unnecessary, a method for manufacturing a design woven fabric from this woven fabric, and a method for manufacturing an interior material comprising this design woven fabric as a design layer.

Specifically, the present invention is as follows.

The woven fabric according to a first aspect of the present invention is a woven fabric comprising a first constituent yarn as one of a warp and a weft and a second constituent yarn as the other, wherein the first constituent yarn has an optical fiber yarn and a non-light guiding yarn other than the optical fiber yarn, the second constituent yarn has a non-light guiding yarn;

the woven fabric has a first region in which the first and second constituent yarns are woven in one layer and a second region which is positioned adjacent to the first region and in which the first and second constituent yarns are woven in two or more separable layers;

the woven fabric has an optical fiber layer and a back protecting layer as the separable layers;

the optical fiber layer is a layer formed of the optical fiber yarn; and the back protecting layer is a layer in which the non-light guiding yarn of the first constituent yarn and the non-light guiding yarn of the second constituent yarn are woven.

The woven fabric as defined in a second aspect of the present invention is the woven fabric according to the first aspect of the present invention, wherein the second region comprises three or more separable layers;

the three layers are a front protecting layer, the optical fiber layer and the back protecting layer in this order; and the front protecting layer is a layer in which the non-light guiding yarn of the first constituent yarn and the non-light guiding yarn of the second constituent yarn are woven.

The woven fabric as defined in a third aspect of the present invention is the woven fabric according to the first aspect or the second aspect of the present invention, which has the first region, the second region positioned adjacent to the first region, and a third region positioned adjacent to the second region on a side opposite to the first region with the second region being sandwiched between the first and third regions; and the third region is a region in which the first and second constituent yarns are woven in one layer and which is narrower in width than the second region.

The woven fabric as defined in a fourth aspect of the present invention is the woven fabric according to any one of the first aspect to the third aspect of the present invention, wherein the non-light guiding yarn of the first constituent yarn has fineness smaller than that of the non-light guiding yarn of the second constituent yarn.

The method for manufacturing a design woven fabric as defined in a fifth aspect of the present invention is a method for manufacturing a design woven fabric using the woven fabric according to any one of the first aspect to the fourth aspect, the method comprising:

an exposure step of cutting off the back protecting layer to expose the optical fiber layer.

The method for manufacturing a design woven fabric as defined in to a sixth aspect of the present invention is the method for manufacturing a design woven fabric according to the fifth aspect of the present invention, which comprises a heat setting step of heat-setting the woven fabric while protecting the optical fiber layer by the back protecting layer, before the exposure step.

The method for manufacturing a design woven fabric as defined in a seventh aspect of the present invention is the method for manufacturing a design woven fabric according to the fifth aspect or the sixth aspect of the present invention, which comprises a resin coating step of coating the back surface of the woven fabric with a resin while protecting the optical fiber layer by the back protecting layer, before the exposure step.

The method for manufacturing an interior material as defined in a eighth aspect of the present invention is a method for manufacturing an interior material using the woven fabric according to any one of the first aspect to the fourth aspect of the present invention, the method comprising:

an exposure step of cutting off the back protecting layer to expose the optical fiber layer; and a tension-attachment step of tension-attaching a design woven fabric obtained through the exposure step to a surface of a base material part.

The woven fabric of the present invention is a woven fabric comprising a first constituent yarn as one of a warp and a weft and a second constituent yarn as the other. Of these yarns, the first constituent yarn has an optical fiber yarn and a non-light guiding yarn. On the other hand, the second constituent yarn has a non-optical guiding yarn. The woven fabric has a first region and a second region positioned adjacent to the first region. Of these regions, the first region is a region in which the first and second constituent yarns are woven in one layer. On the other hand, the second region is a region in which the first and second constituent yarns are woven in two or more separable layers, and the woven fabric has an optical fiber layer and a back protecting layer as the separable layers. Of these layers, the optical fiber layer is a layer formed of the optical fiber yarn, and the back protecting layer is a layer in which the non-light guiding yarn of the first constituent yarn and the non-light guiding yarn of the second constituent yarn are woven.

Specifically, the woven fabric of the present invention has an optical fiber layer formed of an optical fiber yarn and a back protecting layer formed of a non-light guiding yarn as a layer separable from this optical fiber layer.

Therefore, the woven fabric enables protection of the optical fiber yarns (optical fiber layer) while the woven fabric is processed into a design woven fabric and easy exposure of the optical fiber yarns (optical fiber layer) when the protection thereof becomes unnecessary.

In various operation steps interposed while the woven fabric is processed into a design woven fabric, the back protecting layer can function as a protecting layer for the optical fiber yarns (optical fiber layer) to protect the optical fiber yarns (optical fiber layer). Specifically, for example, in a heat application step such as the heat setting step and a step with fear of contamination with other materials such as the resin coating step involving backing, the optical fiber yarns (optical fiber layer) can be protected from heat load and contamination.

When the protection of the optical fiber yarns (optical fiber layer) becomes unnecessary, the back protecting layer alone can be easily separated and cut off from the optical fiber layer because the back protecting layer is woven as a layer separable from the optical fiber layer, whereby the optical fiber yarns (optical fiber layer) can simply be exposed from the woven fabric. In brief, excellent protecting function and excellent operability can be attained at the same time.

When the second region comprises three or more separable layers in the woven fabric of the present invention, these three layers can be a front protecting layer, the optical fiber layer and the back protecting layer in this order. The front protecting layer can be a layer in which the non-light guiding yarn of the first constituent yarn and the non-light guiding yarn of the second constituent yarn are woven.

Specifically, the optical fiber layer is sandwiched between the front protecting layer and the back protecting layer in this structure, and the protection of the optical fiber layer can further be improved as compared with the case where no front protecting layer is present. In addition, since the front protecting layer is woven so as to be separable from the optical fiber layer as well as from the back protecting layer, it is possible to easily separate and cut off the front protecting layer alone from the optical fiber layer and to simply expose the optical fiber yarns (optical fiber layer) from the woven fabric.

The woven fabric of the present invention can further have a third region in addition to the first and second regions. This third region can be positioned adjacent to the second region on a side opposite to the first region with the second region being sandwiched between the first and third regions, and can also be a region in which the first and second constituent yarns are woven in one layer. In this case, the third region can be formed to be narrower in width than the second region.

Thus, when the third region is formed to be narrower in width than the second region, the third region remains even after the unnecessary second region has been cut off as described above, thereby making it possible to prevent the optical fiber layer from being suddenly loosened and separated into discrete optical fiber yarns by cutting off the second region. The group of non-light guiding yarns which constitute the third region is moved in a sliding manner along the longitudinal direction of the optical fiber yarns, thereby making it possible to leave the optical fiber yarns alone, to remove the non-light guiding yarns which constitute the third region alone and to expose the terminal ends of the optical fiber yarns safely.

Also, in the woven fabric of the present invention, the fineness of the non-light guiding yarn of the first constituent yarn can be made smaller than that of the non-light guiding yarn of the second constituent yarn. When the fineness of the non-light guiding yarn of the first constituent yarn is smaller than that of the non-light guiding yarn of the second constituent yarn, the layers separable from the optical fiber layer, such as the back protecting layer and the front protecting layer, can be made flexible. In other words, the flexibility in a direction along the longitudinal direction of the non-light guiding yarn of the first constituent yarn is increased as compared with the case where both of the first and second constituent yarns have large fineness, so that the flexibility of the entire textile is obtained while the light shielding properties by virtue of the second constituent yarn are sufficiently ensured. Along with this, the flexibility of the layers separable from the optical fiber layer can also be increased, thereby obtaining excellent protection. Especially when the woven fabric has the third region, hooking to the first constituent yarn can be reduced. So, the non-light guiding yarns constituting the third region can easily be removed.

The method for manufacturing a design woven fabric according to the present invention comprises the exposure step of cutting off the back protecting layer to expose the optical fiber layer. Specifically, when the protection of the optical fiber layer (optical fiber yarns) becomes unnecessary, it is possible to easily separate and cut off the back protecting layer alone from the optical fiber layer because the back protecting layer is woven as a layer separable from the optical fiber layer, and to simply expose the optical fiber layer from the woven fabric. In other words, excellent operability can be obtained.

The method for manufacturing a design woven fabric according to the present invention can comprise at least one of the heat setting step of heat-setting the woven fabric while protecting the optical fiber layer by the back protecting layer before the exposure step and the resin coating step of coating the back surface of the woven fabric with a resin while protecting the optical fiber layer by the back protecting layer before the exposure step.

Since the woven fabric of the present invention comprises a back protecting layer as described above, the back protecting layer can function as a protecting layer for the optical fiber layer (optical fiber yarns). Accordingly, it is possible to alleviate the heat transfer to the optical fiber layer, thereby preventing thermal damage to the optical fiber layer, in the heat setting step. Also, it is possible to prevent unintentional attachment of the resin for backing to the optical fiber layer, thereby preventing the contamination of the optical fiber layer, in the resin coating step.

The method for manufacturing an interior material according to the present invention comprises the tension-attachment step of tension-attaching a design woven fabric obtained through the exposure step to a surface of a base material part.

According to the present invention, the design woven fabric subjected to heat setting and resin backing processing can be utilized in the manufacture of the interior material. The optical fiber layer (optical fiber yarns) of which thermal damage and contamination are prevented can be utilized while heat setting and resin backing processing are applied.

BRIEF DESCRIPTION OF DRAWINGS

The present invention will be further described in the following detailed description by way of non-limiting examples of typical embodiments according to the present invention and with reference to a plurality of drawings referred to herein. Similar reference numerals represent similar components in some of the drawings.

DETAILED DESCRIPTION

The particulars shown herein are by way of example and for purposes of illustrative discussion of embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, and the description is taken with the drawings making apparent to those skilled in the art how some forms of the present invention may be embodied in practice.

As used herein, the non-light guiding yarn of the first constituent yarn 21 is referred to as "non-light guiding yarn 212," and the non-light guiding yarn of the second constituent yarn 22 is referred to as "non-light guiding yarn 222." Both of the yarns are collectively referred to merely as "non-light guiding yarns," and at least one of the non-light guiding yarn 212 and the non-light guiding yarn 222 is referred to as "non-light guiding yarns (212 and/or 222)."

[1] Woven Fabric (1) Constituent Yarns

Figure 7:
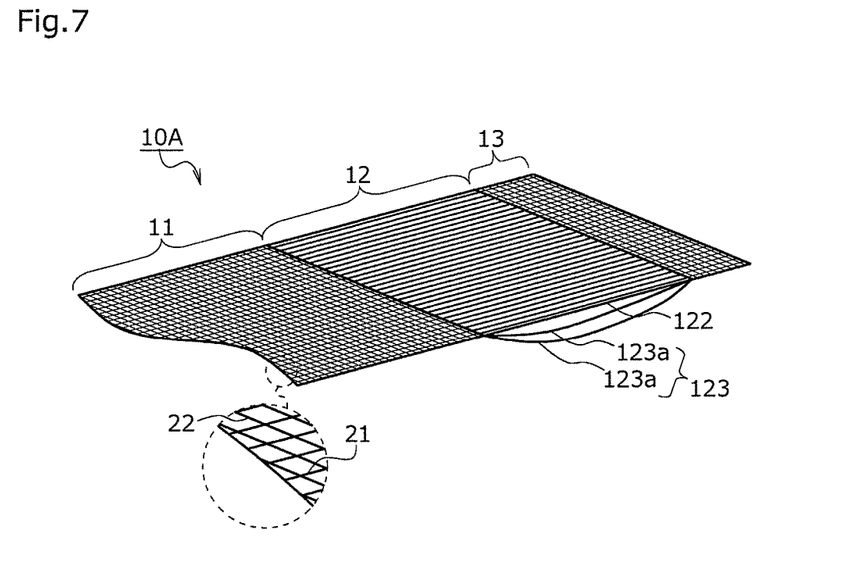
FIG. 7 is a schematic perspective view for explaining another example of the woven fabric of the present invention.

A woven fabric 10A of the present invention comprises a first constituent yarn 21 as one of a warp and a weft and a second constituent yarn 22 as the other. Of these yarns, the first constituent yarn 21 has an optical fiber yarn 211 and a non-light guiding yarn 212 other than the optical fiber yarn (see FIGS. 1, 5 and 7).

The optical fiber yarn (hereinafter also referred to merely as "OF yarn") 211 ensures light incidence from one end of the yarn, guide of the incident light within the yarn, and delivery of the light to the other end of the yarn. In addition, the OF yarn 211 utilized in this woven fabric 10A is preferably an OF yarn 211 that is capable of side emission. Namely, the OF yarn 211 is preferably an OF yarn 211 which can emit (leak) light from the side surface while guiding light from one end to the other end. Specifically, there can be utilized various OF yarns having a core-sheath structure (dual-layer structure) comprising a core and a sheath (cladding) wherein the refractive indexes of the core and the sheath are different from each other.

The OF yarn 211 utilized in the woven fabric 10A is preferably made of a resin from the viewpoint of weaving properties. Specifically, there can be utilized: (1) an OF yarn 211 comprising a core and a sheath in combination, the core and sheath having correlated refractive indexes at which light is not totally reflected and (2) an OF yarn 211 comprising a light scattering substance in the core material. That is, the above (1) is a side emission type OF 211 utilizing a phenomenon that the light guided within the core is not totally reflected between the core and the sheath and is leaked. On the other hand, the above (2) is a side emission type OF 211 having a structure such that light is not totally reflected at the boundary between the core and the sheath and that scattered light leaks out of the side surface of the OF yarn 211, due to the incorporation of a scattering substance. In such OF yarns 211, the side emission luminance can be controlled by adjusting the concentration of the light scattering substance to be incorporated in the core material. Further, side emission type OFs 211 having any structure other than these structures may be employed. These side emission type OFs 211 may be used alone, or two or more thereof may be used in combination.

The diameter of the OF yarn 211 is not particularly limited, and can be defined, for example, as 0.01 mm or more and 2.0 mm or less, preferably as 0.05 mm or more and 1.5 mm or less, more preferably as 0.1 mm or more and 1.0 mm or less, from the viewpoint of suitable obtainment of the weaving properties.

The proportion of the OF yarn 211 occupying the first constituent yarn 21 is not limited, and is normally 10% or more, preferably 10% or more and 90% or less, more preferably 20% or more and 80% or less, further preferably 30% or more and 70% or less.

The non-light guiding yarn 212 is a yarn having no light guiding properties, unlike the optical fiber yarn. The material constituting the non-light guiding yarn 212 is not limited, and may be either natural fibers or synthetic fibers. In the case of synthetic fibers, examples of the constituent resin include polyamide-based resins such as nylon 6 and nylon 66; polyester-based resins such as polyethylene terephthalate, polybutylene terephthalate and polytrimethylene terephthalate; polyolefinic resins such as polypropylene; and polyacrylic resins. These resins may be used alone, or two or more thereof may be used in combination.

The fineness of the non-light guiding yarn 212 is not particularly limited, and can be defined, for example, as 10 dtex or more and 1000 dtex or less, preferably 20 dtex or more and 750 dtex or less, more preferably 30 dtex or more and 500 dtex or less.

However, as will be described below, the fineness of the non-light guiding yarn 212 of the first constituent yarn 21 may be larger than that of the non-light guiding yarn 222 of the second constituent yarn 22, but is preferably smaller than that of the non-light guiding yarn 222 of the second constituent yarn 22.

The non-light guiding yarn 212 may not comprise any light transmission inhibiting component, but can comprise a light transmission inhibiting component. When the non-light guiding yarn 212 comprises a light transmission inhibiting component, the light shielding properties to the OF yarn 211 can be improved.

The light transmission inhibiting component may be any component so long as the component can inhibit light transmission, and, for example, may inhibit light transmission by reflection/dispersion, by light absorption or by any other action. Specifically, examples of the component include colorants (e.g., pigments and dyes), light absorbers and thickeners (e.g., various fillers). These materials may be used alone, or two or more thereof may be used in combination. Among these materials, examples of the pigments can include organic pigments such as azo-based pigments, phthalocyanine-based pigments, perinone-based pigments, perylene-based pigments and anthraquinone-based pigments and inorganic pigments such as carbon black, ultramarine, colcothar, titanium oxide and iron oxide. These pigments may be used alone, or two or more thereof may be used in combination. Also, examples of the dyes can include anthraquinone-based dyes, perinone-based dyes, perylene-based dyes, azo-based dyes, methine-based dyes and quinoline-based dyes. Among these dyes, a dye having a darker color is preferred, and a black dye is especially preferred. These dyes may be used alone, or two or more thereof may be used in combination.

On the other hand, the second constituent yarn 22 has a non-light guiding yarn 222. The second constituent yarn 22 can comprise an optical fiber yarn 211 in addition to the non-light guiding yarn 212, but is preferably a constituent yarn consisting only of the non-light guiding yarn 212 without comprising the optical fiber yarn 211.

The non-light guiding yarn 222 is a yarn which does not have light guiding properties just like the non-light guiding yarn 212. The material constituting the non-light guiding yarn 222 is not limited, and materials similar to those for the non-light guiding yarn 212 can be used. The non-light guiding yarn 222 may not comprise any light transmission inhibiting component just like the non-light guiding yarn 212, but can comprise a light transmission inhibiting component. When the non-light guiding yarn 222 comprises a light transmission inhibiting component, the light shielding properties to the OF yarn 211 can be improved.

The fineness of the non-light guiding yarn 222 is not particularly limited, and can be defined, for example, as 20 dtex or more and 2000 dtex or less, and is defined preferably as 35 dtex or more and 1000 dtex or less, more preferably as 50 dtex or more and 700 dtex or less.

When the fineness $F_{212}$ of the non-light guiding yarn 212 of the first constituent yarn 21 and the fineness $F_{222}$ of the non-light guiding yarn 222 of the second constituent yarn 22 are compared with each other, the fineness $F_{212}$ and the fineness $F_{212}$ may be identical, or either one of the finenesses may be larger than the other. However, the fineness $F_{222}$ is preferably larger than the fineness $F_{212}$.

When the fineness $F_{212}$ is smaller than the fineness $F_{222}$, the layers separable from the optical fiber layer 122, such as the back protecting layer 123 and the front protecting layer 121, can be flexible woven fabric layers. Specifically, in comparison with the case where both of the fineness $F_{212}$ and the fineness $F_{222}$ are large, the flexibility in a direction along the longitudinal direction of the non-light guiding yarn 212 of the first constituent yarn 21 is increased, thereby making it possible to obtain the flexibility of the entire textile while sufficiently ensuring the light shielding properties by virtue of the second constituent yarn 22. Since the flexibility of the layers separable from the optical fiber layer is also increased along with this, more excellent protection can be obtained. Especially when the woven fabric has a third region 13 as will be described below, hooking to the first constituent yarn 21 can be reduced, so that the non-light guiding yarns constituting the third region 13 can easily be removed.

(1) Regions

The woven fabric 10A of the present invention has a first region 11 and a second region 12. In addition, it can have a third region 13. The woven fabric 10A may have the third region 13 or may not have the third region 13 (see FIGS. 1, 5 and 7).

Among these regions, the first region 11 is a region which can constitute a design, i.e., a design region. For example, this region can be formed as a region in which the OF yarn 211 is woven with the non-light guiding yarns (212 and/or 222) so that light emission (light leakage) by the OF yarn 211 is visually recognized as a design such as a regular pattern. The first region 11 may be any region in which the first and second constituent yarns 21 and 22 are woven in one layer. The weaving (the way to weave) thereof is not particularly limited, and known various woven textures and woven structures can be utilized. The phrase "woven in one layer" encompasses all fabrics woven in one layer. Normally, a light emission part can be formed in the design region by the texture in which the OF yarn 211, rather than the non-light guiding yarn 222 of the second constituent yarn 22, is arranged on the design surface side. Similarly, a non-light emission part can be formed in the design region by a texture in which the OF yarn 211, rather than the non-light guiding yarn 222 of the second constituent yarn 22 is arranged on the non-design surface side.

On the other hand, the second and third regions 12 and 13 are provided for the purpose of protecting the OF yarn 211 from the operations in the various steps carried out in the manufacture of a design woven fabric 10B. Finally, the non-light guiding yarns (212 and/or 222) which constitute these regions are removed while the OF yarn 211 is left, thereby forming the design woven fabric 10B as will be described below.

The second region 12 is a region which is positioned adjacent to the first region 11. This region is a region in which the first and second constituent yarns 21 and 22 are woven in two or more separable layers and which has at least an optical fiber layer 122 and a back protecting layer 123 as the separable layers (see FIGS. 1, 5 and 7).

This second region 12 can comprise another separable layer in addition to the optical fiber layer 122 and back protecting layer 123. Examples of such another separable layer include a front protecting layer 121. When the second region 12 comprises the front protecting layer 121, the front protecting layer 121, optical fiber layer 122 and back protecting layer 123 are arranged in this order (see FIGS. 1, 5 and 7).

The optical fiber layer 122 is a layer formed of the OF yarns 211. Normally, the optical fiber layer 122 is a layer formed only of the OF yarns 211 or a layer comprising 20% or less of the non-light guiding yarns (212 and/or 222) based on the total number of the OF yarns 211 which constitute the optical fiber layer 122. Specifically, the OF yarns 211 alone can preferably be picked up from the woven fabric 10A simply when the design woven fabric 10B is formed from the woven fabric 10A of the present invention, and thus it is preferable that the OF yarns 211 and the non-light guiding yarns (212 and/or 222) be not blended or, even if they are blended, the number of the non-light guiding yarns be smaller than that of the OF yarns 211.

Further, when the optical fiber layer 122 comprises the non-light guiding yarns (212 and/or 222), the OF yarns 211 and the non-light guiding yarns (212 and/or 222) may be interlaced (woven), but are preferably not interlaced.

Namely, the optical fiber layer 122 is preferably (1) a layer consisting only of the OF yarns 211, (2) a layer comprising the OF yarns 211 and the non-light guiding yarns (212 and/or 222) and including fewer interlaces between the OF yarns 211 and the non-light guiding yarns (212 and/or 222) than those in the first region 11, or (3) a layer comprising the OF yarns 211 and the non-light guiding yarns (212 and/or 222), these yarns being not interlaced.

On the other hand, the back protecting layer 123 is a layer in which the non-light guiding yarn 212 of the first constituent yarn 21 and the non-light guiding yarn 222 of the second constituent yarn 22 are woven. In other words, the back protecting layer 123 normally does not comprise the OF yarns 211.

The incorporation of the back protecting layer 123 can prevent the OF yarns 211 (optical fiber layer 122) from being damaged to protect the OF yarns 211 in various steps interposed while the woven fabric 10A is processed into the design woven fabric 10B. When the protection of the OF yarns 211 becomes unnecessary, the back protecting layer 123 is formed so as to be separable from the optical fiber layer 122, and thus can be easily cut off in a separated state to expose the optical fiber layer (see FIGS. 2 and 6).

Figure 4:
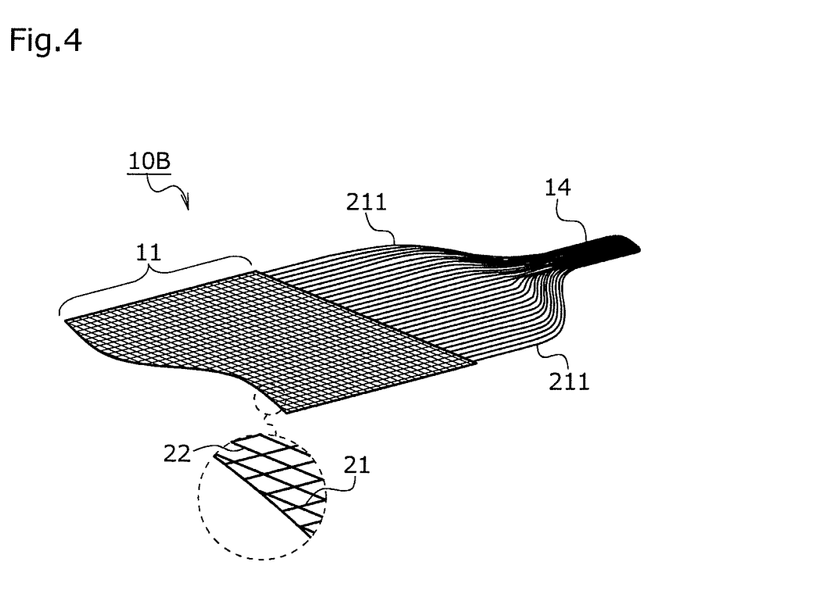
FIG. 4 is a schematic perspective view for explaining one example of the design woven fabric obtained by the present invention.

Normally in the design woven fabric 10B, the terminal ends of the OF yarns 211 are finally collected to form a collected end part 14 (see FIG. 4). This is because the light introduction from a light source to the collected end part 14 eliminates the necessity for individual light introduction to the plurality of OF yarns 211 and enables light introduction to the OF yarns 211 all at once.

After the manufacture of the woven fabric 10A, however, this woven fabric 10A must undergo various steps (for example, refining, dyeing, heat setting, texturing, post processing agent impairing and finish setting) during manufacture of the design woven fabric 10B from this woven fabric 10A, and the OF yarns 211 must be protected also during these steps. Conventionally, the present inventors have manufactured a woven fabric (in the present invention, the woven fabric 10B shown in FIG. 3) in which the terminal ends of the OF yarns 211 are preliminarily exposed, and, in the subsequent steps, and attached a masking tape to the exposed parts of the OF yarns 211 to protect the exposed parts by the masking tape. The protection by the masking tape, however, could not be said to be sufficient from the viewpoint of heat resistance and contamination. Also, such protection has required the steps of separately providing and attaching a masking tape and, after use, the step of peeling and discarding the masking tape, leading to increase in cost, for example, from the viewpoint of the number of steps and the provision of the components.

On the other hand, the present inventors have invented the woven fabric 10A of the present invention which does not require the provision of a separate component such as a masking tape, provides higher protecting function than that of the masking tape, and does not require any step of attaching a masking tape or the like.

Specifically, the woven fabric 10A is configured so that a woven fabric layer separately woven from unnecessary yarns alone is used at least as the back protecting layer 123 without the constituent yarns, which finally become unnecessary, being interlaced with the OF yarns 211; and that this woven fabric layer is arranged, as the back protecting layer 123, on the back side of the optical fiber layer 122. Thus, the masking tape becomes unnecessary, and the heat resistance of the back protecting layer 123 as a protecting layer is improved more than that of the masking tape, in heat application steps such as the heat setting step. Also in steps with contamination such as the resin coating step involving backing, the contamination can be prevented.

The texture which constitutes the back protecting layer 123 is not particularly limited, and known various woven textures and woven structures can be utilized. Also, the back protecting layer 123 can be multilayered as mutually separable woven fabric layers, according to need. For example, the back protecting layer 123 can be composed of mutually separable layers, i.e., a first back protecting layer 123a and a second back protecting layer 123b (see FIG. 7). In this case, the yarn densities of the respective woven fabric layers, i.e., the first and second back protecting layers 123a and 123b, are decreased as compared with the case where the back protecting layer 123 is plain-woven in one layer, but the entire thickness of the back protecting layers can be increased. Therefore, the back protecting layer can provide higher heat resistance as a whole. Of course, when the multilayered woven fabric layer, for example, including the first and second back protecting layers 123a and 123b is formed in one layer using binding yarns, the single-layer back protecting layer 123 is formed, and can have excellent heat resistance as well.

Further, the front protecting layer 121 can be multilayered, but more constituent yarns are preferably utilized to form the back protecting layer 123 from the viewpoint of improvement in the function of the back protecting layer 123. Accordingly, in this case, the yarn density of the back protecting layer 123 (when multilayered, the entire back protecting layer 123) is preferably configured to be larger than the yarn density of the front protecting layer 121.

The front protecting layer 121 (see FIGS. 5 and 6) is a layer woven from the non-light guiding yarn 212 of the first constituent yarn 21 and the non-light guiding yarn 222 of the second constituent yarn 22. In other words, the front protecting layer 121 normally does not comprise the OF yarns 211.

The incorporation of the front protecting layer 121 can prevent the OF yarns 211 (optical fiber layer 122) from being damaged to protect the OF yarns 211 in various steps interposed while the woven fabric 10A is processed into the design woven fabric 10B. While the back protecting layer 123 is a layer which protects the back side of the optical fiber layer 122, the front protecting layer 121 can function as a layer which protects the front side of the optical fiber layer 122.

Especially, when the woven fabric comprises this front protecting layer 121, the second region 12 has a structure such that the optical fiber layer 122 is sandwiched between the front and back protecting layers 121 and 123, and the protection of the optical fiber layer 122 can further be improved as compared with the case where the woven fabric does not have any front protecting layer. In addition, the front protecting layer 121 is woven so as to be separable from the optical fiber layer 122 and back protecting layer 123, and thus the front protecting layer 121 alone can easily be separated and cut off from the optical fiber layer 122. Therefore, the OF yarns 211 (optical fiber layer 122) can be exposed from the woven fabric 10A simply.

The texture which constitutes the front protecting layer 121 is not particularly limited, and known various woven textures and woven structures can be utilized. Also, the front protecting layer 121 can also be multilayered as mutually separable woven fabric layers according to need, as with the back protecting layer 123.

Also, the woven fabric 10A of the present invention can have the third region 13 in addition to the first and second regions 11 and 12. This third region 13 is a region which is positioned adjacent to the second region 12 on a side opposite to the first region 11 with the second region 12 being sandwiched between the third and first regions 13 and 11. Also, the third region 13 is a region in which the first constituent yarn 21 and the second constituent yarn 22 are woven in one layer, and which is formed to be narrower in width than the second region 12 (see FIGS. 1, 5 and 7).

While this third region 13 may be arranged in the following order: the first region 11, the second region 12 and the third region 13. In the woven fabric 10A, the third region 13 may be arranged at any position, and can more effectively exert its function when arranged at an end part of the woven fabric 10A. Specifically, in the case where the woven fabric 10A has the second region 12 alone, the OF yarns 211, which are present in a part from an end of the first region 11 to an end part of the woven fabric 10A, would suddenly fall apart when the back and front protecting layers 123 and 121 in the second region 12 are cut off. On the other hand, when the woven fabric 10A has the third region 13, the end parts of the respective OF yarns 211 are integrated as the third region 13, and thus the OF yarns 211 would not fall apart immediately even when the back and front protecting layers 123 and 121 of the second region 12 are cut off. Accordingly, the OF yarns 211 can be handled more safely, and the operability can be improved from the viewpoint of safe handling of the OF yarns 211.

The third region 13 is a region which can be removed according to need. Specifically, the non-light guiding yarns (212 and/or 222) which constitute the third region 13, alone, can be efficiently removed by moving the non-light guiding yarns (212 and/or 222) in a sliding manner along the longitudinal direction of the OF yarns 211 (see FIG. 3). Thus, the end parts of the OF yarns 211 can be exposed safely by removing only the non-light guiding yarns (212 and/or 222) which constitute the third region 13.

The texture which constitutes the third region 13 is not particularly limited, and known various woven textures and woven structure can be utilized. In view of the above action, however, a texture with few interlaces of the other non-light guiding yarns (212 and/or 222) with the OF yarns 211 is preferred. The texture with few interlaces of the other non-light guiding yarns with the OF yarns 211 allows easier removal of the non-light guiding yarns (212 and/or 222) which constitute the third region 13. Specifically, the number of interlaces between the OF yarns 211 and the non-light guiding yarns 222 which constitute the second constituent yarns 22 in the third region 13 is preferably smaller than that in the first region 11.

Further, as described above, the third region 13 has the function to bundle the OF yarns 211 so that the yarns would not fall apart after the back and front protecting layers 123 and 121 which constitute the second region 12 have been cut off. From the viewpoint of the utilization of this function, the third region 13 only has to temporarily bundle the OF yarns 211, and thus does not have to be wide so much. Accordingly, the third region 13 can be made narrower in width than the second region 12.

The phrase "narrower in width than the second region 12" means that, when the length of the second region 12 in the longitudinal direction of the OF yarns 211 is defined as the width of the second region 12 (i.e., the width of the region sandwiched between the first region 11 and the third region 13), the average width of the third region 13 is smaller than that of the second region 12. More specifically, the average width of the third region 13 is preferably 70% or less, more specifically 50% or less of the average width of the second region 12.

Since the non-light guiding yarns (212 and/or 222) which constitute the second region 12 can be cut off in this manner, the non-light guiding yarns can be easily removed even when the third region 13 remains in the woven fabric 10B, which is a characteristic feature of the present invention. Specifically, when attempting to remove the non-light guiding yarns (212 and/or 222) alone from the third region in which the OF yarns 211 and the non-light guiding yarns (212 and/or 222) are woven, it is normally necessary, for example, to cut all of the non-light guiding yarns 212 of the first constituent yarns 21 at necessary positions to make the texture independent, or to loosen the interlaces between the first and second constituent yarns 21 and 22 one by one and pull out the non-light guiding yarns (212 and/or 222) to reduce the interlaces of the non-light guiding yarns with the OF yarns 211. This operation, however, requires much labor and a number of steps, and the OF yarns 211 may possibly be damaged in this process.

On the other hand, in the woven fabric 10A of the present invention, the back and front protecting layers 123 and 121 which constitute the second region 12 are cut off so that the non-light guiding yarns which constitute the third region 13 are made independent from the non-light guiding yarns which constitute the first region 11, and thus can be easily slid along the OF yarns 211 to be removed. Thus, it is possible to improve the operability while preventing the OF yarns 211 from being damaged.

Incidentally, in the woven fabric 10A of the present invention, a surface of the first region 11 (a surface which does not have the back protecting layer 123) normally serves as a design surface, but the present invention is not limited to this. Namely, in the first region 11, the surface on the same side as that having the back protecting layer 123 can also serve as a design surface.

[2] Design Woven Fabric

The design woven fabric 10B is a woven fabric in which at least the back protecting layer 123 has been removed from the woven fabric 10A so that the optical fiber layer 122 is exposed. When the woven fabric 10A comprises the front protecting layer 121, the front protecting layer 121 may not be cut off, but is preferably cut off (see FIG. 6). Further, when the woven fabric 10A having the third region 13 is used to obtain the design woven fabric 10B, the third region 13 may remain in the design woven fabric 10B, but is preferably removed (see FIG. 3). In the design woven fabric 10B, the OF yarns 211 exposed at an end part thereof may not be collected, but are preferably collected to form a collected end part 14 (see FIG. 4).

The collected end part 14 (see FIG. 4) is a site which is positioned at an end part of the design woven fabric 10B and at which the OF yarns 211 are collected. This collected end part 14 is normally composed only of the OF yarns 211, but may include some of the non-light guiding yarns 212 of the first constituent yarns 21. Also, the number of the collected end part 14 may be one, but can be two or more, with respect to the entire design woven fabric 10B. Specifically, all the OF yarns 211 which constitute the first constituent yarns 21 may be collected in a lump, with respect to one collected end part 14. Alternatively, the OF yarns 211 which constitute the first constituent yarns 21 may be divided into parts including an appropriate number of yarns, and the respective parts of yarns are collected with respect to a plurality of the collected end parts 14.

The OF yarns 211 are collected to the collected end part 14, so that light can be introduced from a light source to the plurality of OF yarns 211 in a lump. Specifically, the end surface of the collected end part 14 can be utilized as a light introduction end surface (end surface at which the end surfaces of the OF yarns 211 are exposed and collected in approximately the same direction). The light introduction end surface can be formed by means of a conventionally known method and, according to need, by applying appropriate processing. For example, it is possible to collect and fix the OF yarns 211 at the collected end part 14 and then polish the cut surface obtained by cutting the OF yarns 211 for length adjustment, thereby obtaining the light introduction end surface. Further, the OF yarns 211 can be bundled and fixed so that they would not fall apart, by aligning the end parts of the OF yarns 211, inserting them into a cylindrical jig (for example, a collecting cylinder) and crimping or adhering them.

[3] Method for Manufacturing Design Woven Fabric

Figure 2:
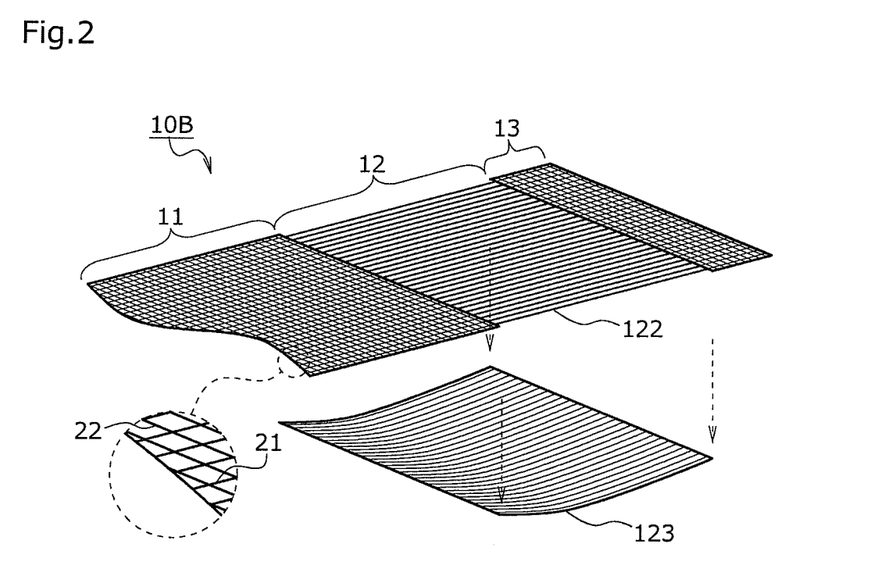
FIG. 2 is a schematic perspective view for explaining one example of a design woven fabric obtained by the present invention.
Figure 6:
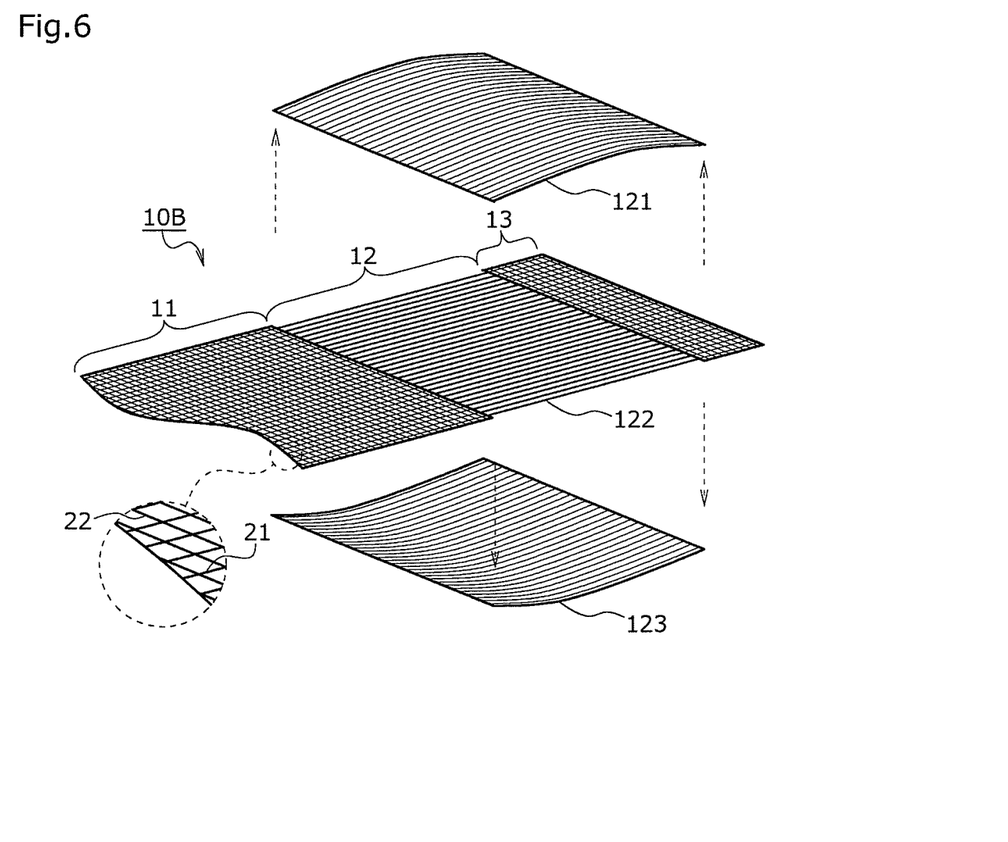
FIG. 6 is a schematic perspective view for explaining another example of the design woven fabric obtained by the present invention.

The method for manufacturing a design woven fabric according to the present invention is a method for manufacturing a design woven fabric 10B using the woven fabric 10A, and comprises the exposure step of cutting off the back protecting layer 123 from the woven fabric 10A to expose the optical fiber layer 122 (see FIGS. 2 and 6).

Any exposure step may be employed as this exposure step so long as the optical fiber layer 122 is exposed. The method of cutting off the back protecting layer 123 is not particularly limited. Normally, the back protecting layer 123 can be separated from the woven fabric 10A by cutting the end edge part close to the first region 11 of the back protecting layer 123 and the end edge part close to the third region 13 of the back protecting layer 123, respectively.

The method for manufacturing the design woven fabric according to the present invention can comprise the heat setting step of heat-setting the woven fabric 10A while protecting the optical fiber layer 122 by the back protecting layer 123 before the exposure step.

When the manufacturing method comprises the heat setting step, the heat setting step is carried out before the exposure step, thereby making it possible to protect the optical fiber layer 122 by the back protecting layer 123 during heating through heat setting. Therefore, excellent operation efficiency is obtained without need to interpose, for example, a heat buffering layer.

The heat setting step is a step of heating the design woven fabric 10B. This heating can be performed while tension is applied to the design woven fabric 10B using a pin tenter or the like. The heat setting step may be performed for any purposes. For example, the heat setting step may be performed for the purpose of stretching creases formed in the woven fabric, stabilizing the positions of the constituent yarns or shrinking the constituent yarns to impart stretchability to the woven fabric. The heat setting step may be performed for one of these purposes or for two or more thereof. Further, the heat setting step may be applied to the design woven fabric 10B only once, but can also be applied to a plurality of times.

The method for manufacturing the design woven fabric according to the present invention can comprise the resin coating step of coating the back surface of the woven fabric 10A with a resin while protecting the optical fiber layer 122 by the back protecting layer 123 before the exposure step.

When the manufacturing method comprises the resin coating step, the resin coating step is performed before the exposure step, thereby making it possible to protect the optical fiber layer 122 by the back protecting layer 123 during resin application through resin coating and immersion. Therefore, the operation can also be performed without interposition of any other protecting sheet or the like.

[4] Method for Manufacturing Interior Material

The method for manufacturing an interior material according to the present invention is a method for manufacturing an interior material 30 (see FIG. 8) using the woven fabric 10A, and comprises the exposure step of cutting off the back protecting layer 123 to expose the optical fiber layer 122 and the tension-attachment step of tension-attaching a design woven fabric 10B obtained through the exposure step to a surface of a base material part 31.

Specifically, the interior material 30 obtained by the present method comprises the base material part 31 and the design woven fabric 10B tension-attached to a surface thereof. The base material part 31 may be any material so long as it serves as a support for the design woven fabric 10B. For example, a board having an approximately uniform thickness as a whole can be utilized.

Figure 8:
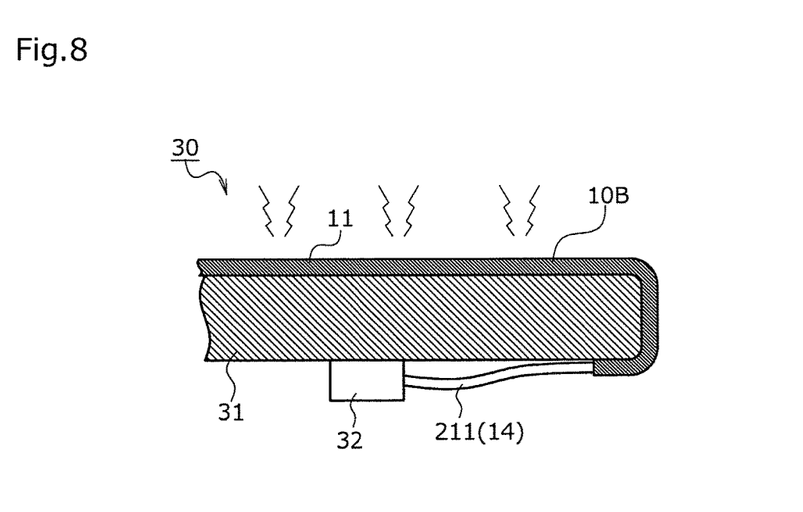
FIG. 8 is a schematic sectional view for explaining one example of an interior material obtained by the present invention.

Examples of this interior material 30 include a form including the base material part 31 and the design woven fabric 10B tension-attached to a surface thereof, wherein an end part of the design woven fabric 10B is folded to the back side along an end part of the base material part 31, as shown in FIG. 8. There can be employed a form wherein a light source 32 arranged on the back side of the base material part 31 and the OF yarns 211 (or collected end part 14 obtained by collecting the OF yarns 211) taken out from the design woven fabric 10B are optically connected to each other. Thus, it is possible to arrange the light source 32 on the back side of the base material part 31 and to make light incident from end parts of the OF yarns 211 so that the first region 11, which is a design surface of the design woven fabric 10B, can emit light.

Incidentally, the design woven fabric 10B can comprise any other layer interposed between itself and the base material part 31. Examples of such other layers include a cushion layer (arranged between the design woven fabric 10B and the base material part).

Such an interior component can widely be utilized as an interior component in various fields such as vehicles (e.g., automobiles and railway vehicles), aircraft, ships and architecture, and, among others, is suitable as various trims for vehicle purposes.

The woven fabric of the present invention, for example, is widely utilized as an interior component in various fields such as vehicles (e.g., automobiles and railway vehicles), aircraft, ships and architecture and as a woven fabric which constitutes the design surface.

Specifically, there are indicated: trim components such as door trims, arum rests, upper trims, decoration panels, ornament panels, lower trims, pockets (door trim pockets) and quarter trims of automobiles; pillar garnishes; cowl side garnishes (cowl side trims); seat components such as side air bag peripheral components; instrument panel components such as center clusters, registers, center boxes (doors), grab doors and air bag peripheral components; center consoles; overhead consoles; sun visors; deck boards (luggage boards) and under trays; package trays; CRS covers; seat side garnishes; and assist grips.

Embodiment 1

Figure 1:
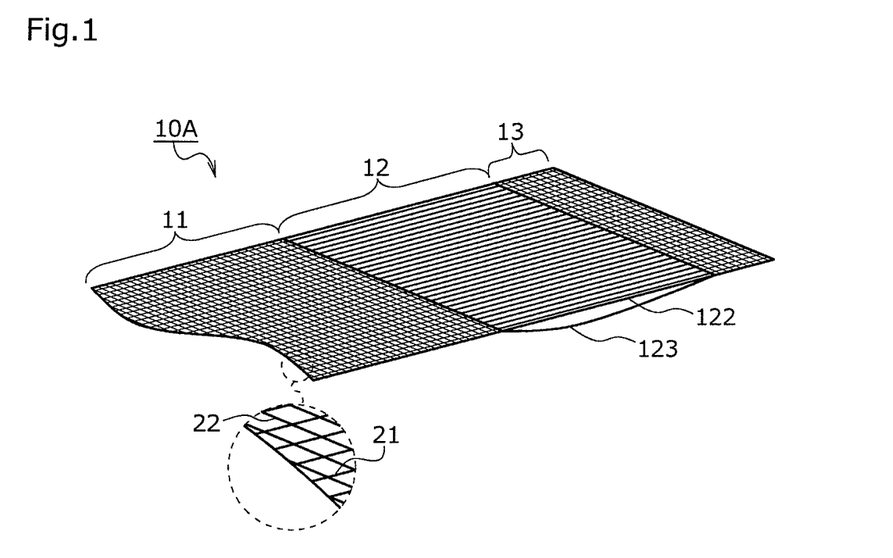
FIG. 1 is a schematic perspective view for explaining one example of a woven fabric of the present invention.

The woven fabric 10A shown in FIG. 1 is a woven fabric woven from a first constituent yarn 21 as a warp and a second constituent yarn 22 as a weft. However, it is not limited which of the first and second constituent yarns 21 and 22 is the warp and which of the first and second constituent yarns 21 and 22 is the weft.

The first constituent yarn 21 comprises an OF yarn 211 (side emission type optical fiber yarn) and a non-light guiding yarn 212. On the other hand, the second constituent yarn 22 consists only of a non-light guiding yarn 222. The non-light guiding yarns 212 and 222 are light shielding yarns which can exert the light shielding performance to the OF yarns 211, and the non-light guiding yarn 212 is configured to have fineness smaller than that of the non-light guiding yarn 222.

The woven fabric 10A has a first region 11 in which the first constituent yarn 21 and the second constituent yarn 22 are woven in one layer. The first region 11 is a design region. At a site where the non-light guiding yarn 222 (which is a light shielding yarn) is arranged on the non-design surface side of the OF yarn 211, the OF yarn 211 is exposed to the design surface side, so that a light emission design is obtained. On the other hand, at a site where the non-light guiding yarn 222 (which is a light shielding yarn) is arranged on the design surface side of the OF yarn 211, the OF yarn 211 is not exposed to the design surface side, so that a non-light emission design is obtained. By virtue of the combination of these textures, a light emitting design is applied to the design surface (surface on a side on which the back protecting layer 123 is not arranged) of the first region 11.

The woven fabric 10A further has a second region 12 positioned adjacent to the first region 11. In the second region, the first and second constituent yarns 21 and 22 are woven in two separable layers. The two separable layers are an optical fiber layer 122 and a back protecting layer 123. In Embodiment 1, the optical fiber layer 122 is woven to be arranged to be closer to the design surface side than the back protecting layer 123. Of these layers, the optical fiber layer 122 is a layer formed only of the OF yarn 211, and the back protecting layer 123 is a layer woven from the non-light guiding yarns 212 and 222.

In FIG. 1, the back protecting layer 123 is expressed in a form such that it is loosened to the non-design surface side, for convenience sake of the figure, for the purpose of meaning that the optical fiber layer 122 and the back protecting layer 123 are separable layers, but, actually, the back protecting layer 123 may either be loosened or not be loosened in such a manner.

The woven fabric 10A further has a third region 13 positioned adjacent to the second region 12 on a side opposite to the first region 11 with the second region 12 being sandwiched between the first and third regions 11 and 13. In the third region 13, the first and second constituent yarns 21 and 22 are woven in one layer, and the third region 13 is formed to be narrower in width than the second region 12.

The woven fabric 10A shown in FIG. 1 is subjected to the heat setting step and resin coating step while the back protecting layer 123 functions as a protecting layer for the optical fiber layer 122. Then, the end edge part of the back protecting layer 123, which is in contact with the first region 11, and the end edge part of the back protecting layer 123, which is in contact with the third region 13, are cut with scissors to cut off the back protecting layer 123, as shown in FIG. 2 (exposure step). Thus, the woven fabric 10A is formed into the design woven fabric 10B wherein the optical fiber layer 122 is exposed.

Figure 3:
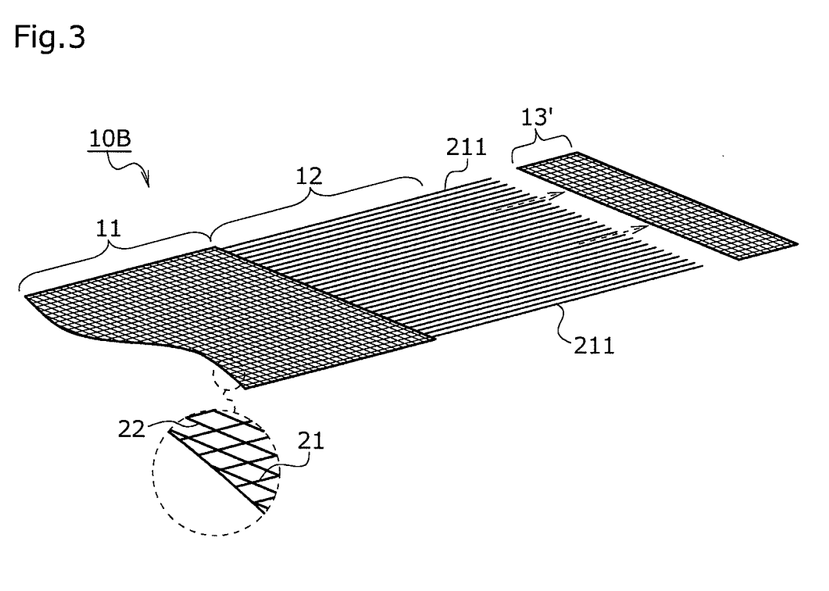
FIG. 3 is a schematic perspective view for explaining one example of the design woven fabric obtained by the present invention.

Next, the non-light guiding yarns which constitute the third region 13 are slid along the longitudinal direction of the OF yarns 211, as shown in FIG. 3, to remove only the non-light guiding yarns which constitute the third region 13 without damaging the OF yarns 211 in the third region 13. Thus, end parts of the OF yarns 211 in the design woven fabric 10B are exposed. Thereafter, as shown in FIG. 4, the end parts of the OF yarns 211 are collected in a lump to form a collected end part 14 and hardened with a resin to fix the OF yarns 211 together. Then, the end surface thereof is polished, thereby making it possible to obtain a light guiding end surface for introducing light. Incidentally, all the OF yarns 211 are collected as one collected end part 14 in FIG. 4, but the present invention is not limited to this embodiment. The OF yarns 211 may be divided and collected into a plurality of collected end parts.

Further, as shown in FIG. 8, the thus-obtained design woven fabric 10B is tension-attached (tension-attachment step) along one surface side of the base material part 31, and the end part thereof is fixed to the back side of the base material part 31 along the side surface of the base material part 31. A light source 32 arranged on the back side of the base material part 31 and the OF yarns 211 which constitute the collected end part 14 arranged at a terminal end of the design woven fabric 10B can be optically connected to each other. Thus, light is introduced from the light source 32 to the collected end part 14, thereby obtaining the interior material 30 which can make the first region 11 as the design region to emit light according to need.

Embodiment 2

Figure 5:
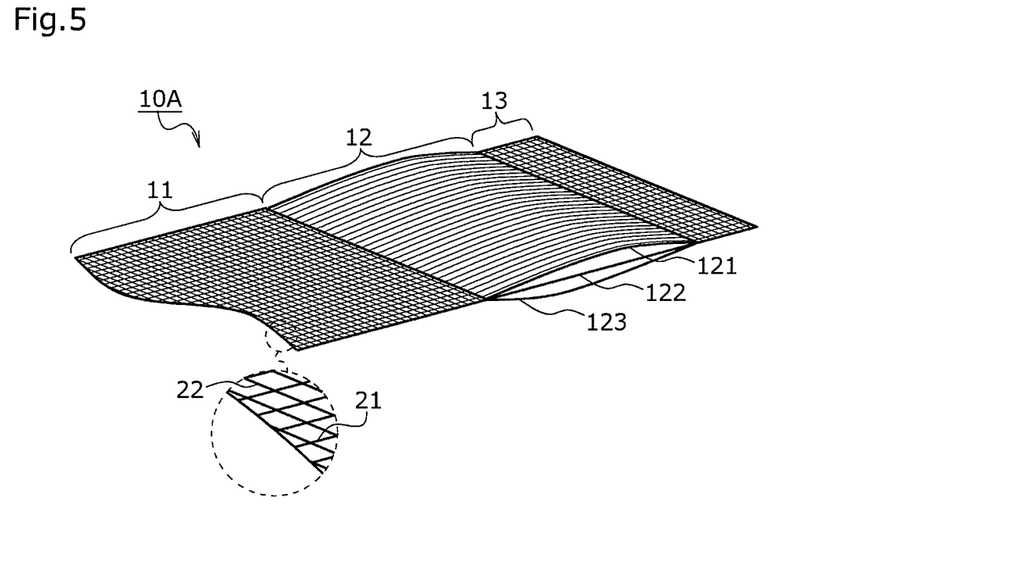
FIG. 5 is a schematic perspective view for explaining another example of the woven fabric of the present invention.

A woven fabric 10A shown in FIG. 5 is different from the woven fabric 10A of Embodiment 1 in comprising a front protecting layer 121, and is identical therewith in other respects.

The woven fabric 10A has a second region 12 positioned adjacent to the first region 11. In the second region, the first and second constituent yarns 21 and 22 are woven in three separable layers. The three separable layers are laminated in the order of: the front protecting layer 121, the optical fiber layer 122 and the back protecting layer 123. These three layers are formed by double weaving, and the front and back protecting layers 121 and 123 are woven from the non-light guiding yarns 212 and 222, respectively. Also, the optical fiber layer 122 is a layer formed only of the OF yarns 211.

In FIG. 5, the front protecting layer 121 and the back protecting layer 123 are expressed in forms loosened to the design surface side and to the non-design surface side, respectively, for convenience sake of the figure, for the purpose of meaning that the optical fiber layer 122, the front protecting layer 121 and the back protecting layer 123 are separable. Actually, however, the protecting layers may either be loosened or not be loosened in such manners.

The woven fabric 10A shown in FIG. 5 is subjected to the heat setting step and resin coating step while the back protecting layer 123 functions as a protecting layer for the optical fiber layer 122. Then, the end edge part of the front protecting layer 121, which is in contact with the first region 11, and the end edge part of the front protecting layer 121, which is in contact with the third region 13, are cut with scissors to cut off the front protecting layer 121, as shown in FIG. 6. Similarly, the end edge part of the back protecting layer 123, which is in contact with the first region 11, and the end edge part of the back protecting layer 123, which is in contact with the third region 13, are cut with scissors to cut off the back protecting layer 123, as shown in FIG. 6 (exposure step). Thus, the woven fabric 10A is formed into the design woven fabric 10B wherein the optical fiber layer 122 is exposed.

In the other respects, it is possible to remove the non-light guiding yarns which constitute the third region 13, to form the collected end part 14 and thus to obtain the interior material 30, in a similar manner as in Embodiment 1.

What is claimed is:

1. A woven fabric comprising a first constituent yarn as one of a warp and a weft and a second constituent yarn as the other, wherein the first constituent yarn has an optical fiber yarn and a non-light guiding yarn other than the optical fiber yarn, the second constituent yarn has a non-light guiding yarn; the woven fabric has a first region in which the first and second constituent yarns are woven in one layer and a second region which is positioned adjacent to the first region and in which the first and second constituent yarns are woven in two or more separable layers;

the woven fabric has an optical fiber layer and a back protecting layer as the separable layers;

the optical fiber layer is a layer formed of the optical fiber yarn; and the back protecting layer is a layer in which the non-light guiding yarn of the first constituent yarn and the non-light guiding yarn of the second constituent yarn are woven.

2. The woven fabric according to claim 1, wherein the second region comprises three or more separable layers;

the three layers are a front protecting layer, the optical fiber layer and the back protecting layer in this order; and the front protecting layer is a layer in which the non-light guiding yarn of the first constituent yarn and the non-light guiding yarn of the second constituent yarn are woven.

3. The woven fabric according to claim 1, which has the first region, the second region positioned adjacent to the first region, and a third region positioned adjacent to the second region on a side opposite to the first region with the second region being sandwiched between the first and third regions; and the third region is a region in which the first and second constituent yarns are woven in one layer and which is narrower in width than the second region.

4. The woven fabric according to claim 1, wherein the non-light guiding yarn of the first constituent yarn has fineness smaller than that of the non-light guiding yarn of the second constituent yarn.

5. A method for manufacturing a design woven fabric using the woven fabric according to claim 1, the method comprising:

an exposure step of cutting off the back protecting layer to expose the optical fiber layer.

6. The woven fabric according to claim 5, wherein the second region comprises three or more separable layers;

the three layers are a front protecting layer, the optical fiber layer and the back protecting layer in this order; and the front protecting layer is a layer in which the non-light guiding yarn of the first constituent yarn and the non-light guiding yarn of the second constituent yarn are woven.

7. The woven fabric according to claim 5, which has the first region, the second region positioned adjacent to the first region, and a third region positioned adjacent to the second region on a side opposite to the first region with the second region being sandwiched between the first and third regions; and the third region is a region in which the first and second constituent yarns are woven in one layer and which is narrower in width than the second region.

8. The woven fabric according to claim 5, wherein the non-light guiding yarn of the first constituent yarn has fineness smaller than that of the non-light guiding yarn of the second constituent yarn.

9. The method for manufacturing a design woven fabric according to claim 5, which comprises a heat setting step of heat-setting the woven fabric while protecting the optical fiber layer by the back protecting layer, before the exposure step.

10. The method for manufacturing a design woven fabric according to claim 5, which comprises a resin coating step of coating the back surface of the woven fabric with a resin while protecting the optical fiber layer by the back protecting layer, before the exposure step.

11. A method for manufacturing an interior material using the woven fabric according to claim 1, the method comprising:
an exposure step of cutting off the back protecting layer to expose the optical fiber layer; and
a tension-attachment step of tension-attaching a design woven fabric obtained through the exposure step to a surface of a base material part.

12. The woven fabric according to claim 11, wherein
the second region comprises three or more separable layers;
the three layers are a front protecting layer, the optical fiber layer and the back protecting layer in this order; and
the front protecting layer is a layer in which the non-light guiding yarn of the first constituent yarn and the non-light guiding yarn of the second constituent yarn are woven.

13. The woven fabric according to claim 11, which has the first region, the second region positioned adjacent to the first region, and a third region positioned adjacent to the second region on a side opposite to the first region with the second region being sandwiched between the first and third regions; and
the third region is a region in which the first and second constituent yarns are woven in one layer and which is narrower in width than the second region.

14. The woven fabric according to claim 11, wherein the non-light guiding yarn of the first constituent yarn has fineness smaller than that of the non-light guiding yarn of the second constituent yarn.

* * * * *